US011993100B2

(12) United States Patent
Mariani et al.

(10) Patent No.: US 11,993,100 B2
(45) Date of Patent: May 28, 2024

(54) MOTORCYCLES TYRE

(71) Applicant: Pirelli Tyre S.p.A., Milan (IT)

(72) Inventors: Mario Mariani, Milan (IT); Luca Bruschelli, Milan (IT); Giuliano Bonaccorsi, Milan (IT); Matteo Torchiana, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 421 days.

(21) Appl. No.: 17/295,027

(22) PCT Filed: Nov. 29, 2019

(86) PCT No.: PCT/IB2019/060325
§ 371 (c)(1),
(2) Date: May 18, 2021

(87) PCT Pub. No.: WO2020/110080
PCT Pub. Date: Jun. 4, 2020

(65) Prior Publication Data
US 2022/0048330 A1 Feb. 17, 2022

(30) Foreign Application Priority Data
Nov. 30, 2018 (IT) .................. 102018000010727

(51) Int. Cl.
*B60C 11/03* (2006.01)
(52) U.S. Cl.
CPC ........ *B60C 11/0302* (2013.01); *B60C 11/032* (2013.01); *B60C 11/0332* (2013.01);
(Continued)
(58) Field of Classification Search
CPC ............. B60C 11/03; B60C 2011/0339; B60C 2011/0341
See application file for complete search history.

(56) References Cited

U.S. PATENT DOCUMENTS 6,200,401 B1 * 3/2001 Watkins .............. B60C 11/0302
152/903
2005/0115653 A1 6/2005 Miyasaka et al.
(Continued)

FOREIGN PATENT DOCUMENTS

CN 102470703 A 5/2012
CN 102574427 A 7/2012
(Continued)

OTHER PUBLICATIONS

Notification of the First Office Action issued by the China National Intellectual Property Administration dated Oct. 8, 2022, in corresponding Application No. CN 201980076759.9 (5 pages).
(Continued)

*Primary Examiner* — Cedrick S Williams
(74) *Attorney, Agent, or Firm* — Finnegan, Henderson, Farabow, Garrett & Dunner, L.L.P.

(57) ABSTRACT

A motorcycle tyre has a tread band (8) comprising a plurality of grooves that form a tread pattern including a module (T) replicated along a circumferential direction of the tyre (1) and having a predetermined circumferential length (C1). The module (T) comprises a pair of circumferential grooves (20) arranged on opposite sides with respect to the equatorial plane (X-X) of the tyre (1). Such circumferential grooves (20) extend along the circumferential direction of the tyre (1) for only part of said predetermined circumferential length (C1) and define between them a central portion (A) of tread band (8) having a void to solid ratio substantially equal to zero and a predetermined axial width (A1). The module (T) further comprises a plurality of transversal grooves (30, 31, 32, 33) arranged on opposite sides with respect to the equatorial plane (X-X) at a distance from said equatorial plane (X-X) greater than that of said circumferential grooves (20) and a pair of first lateral annular portions (B) axially arranged between said circumferential grooves (20) and said (Continued)

plurality of pairs of transversal grooves (30, 31, 32, 33), each of said first lateral annular portions (B) comprising, in a position axially adjacent to the respective circumferential groove (20), a respective part (B1) of tread band having a circumferential length at least equal to that of said circumferential grooves (20) and a void to solid ratio substantially equal to zero. The tyre (1) has a curvature ratio lower than about 0.32.

16 Claims, 3 Drawing Sheets

(52) U.S. Cl.
CPC ............... *B60C 2011/0341* (2013.01); *B60C 2011/0388* (2013.01); *B60C 2200/10* (2013.01)

(56) References Cited

U.S. PATENT DOCUMENTS

| | | | |
|---|---|---|---|
| 2009/0255615 A1 | 10/2009 | Ishiyama et al. | |
| 2011/0132509 A1* | 6/2011 | Kasai | B60C 11/0302 |
| | | | 152/209.18 |
| 2011/0253276 A1* | 10/2011 | Misani | B60C 11/0302 |
| | | | 152/209.1 |
| 2012/0186712 A1* | 7/2012 | Schiavolin | B60C 11/0302 |
| | | | 152/209.23 |
| 2016/0318350 A1 | 11/2016 | Matsumoto | |

FOREIGN PATENT DOCUMENTS

| | | |
|---|---|---|
| CN | 103857540 A | 6/2014 |
| CN | 108290452 A | 7/2018 |
| CN | 108349319 A | 7/2018 |
| EP | 1473176 A1 | 11/2004 |
| EP | 1918131 A1 | 5/2008 |
| EP | 3088211 A1 | 11/2016 |
| EP | 2760682 B1 | 11/2017 |
| JP | 2006-117189 A | 5/2006 |
| JP | 2007-99147 A | 4/2007 |
| WO | WO 2010/041283 A1 | 4/2010 |
| WO | WO 2010/073279 A1 | 7/2010 |
| WO | WO 2011/012980 A1 | 2/2011 |

OTHER PUBLICATIONS

International Search Report form the European Patent Office in corresponding International Application No. PCT/IB2019/060325 dated Mar. 12, 2020.
Written Opinion of the International Searching Authority from the European Patent Office in corresponding International Application No. PCT/IB2019/060325 dated Mar. 12, 2020.

* cited by examiner

MOTORCYCLES TYRE

This application is a national phase application under 35 U.S.C. § 371 based on International Application No. PCT/162019/060325, filed Nov. 29, 2019, and claims priority of Italian Patent Application No. 102018000010727, filed Nov. 30, 2018; the contents of each application is incorporated herein by reference.

The present invention relates to a motorcycle tyre.

In particular, the invention relates to a tyre intended to be used on "Sport Touring" motorcycles, i.e. sports motorcycles intended to offer high performance in terms of power, comfort and mileage, designed to be used on different types of terrains and with different road surface conditions.

Typically Sport Touring motorcycles are motorcycles of high piston displacement (for example 800 $cm^3$ or more), and/or high power (for example 100-120 horse power or more).

Preferably, the tyre of the invention is intended to be used in rear wheels of Sport Touring motorcycles.

PRIOR ART

EP 3 088 211, EP 1 473 176, JP 2006 117189, EP 1 918 131 and JP 2007 099147 describe tyres for vehicle wheels provided with a pair of continuous circumferential grooves arranged on opposite sides with respect to the equatorial plane of the tyre.

Tyres for rear wheels of Sport Touring motorcycles are for example described in the following patent applications to the Applicant: WO 2010/073279 and WO 2011/012980.

SUMMARY OF THE INVENTION

For the purposes of the present invention the following definitions apply.

The term "motorcycle tyre" is used to indicate a tyre having a high curvature ratio (typically greater than 0.20) and capable of reaching high camber angles during cornering.

The term "curvature ratio" is used to indicate the ratio between the distance comprised between the radially highest point of the tread band and the maximum radial section width (also called "maximum cord") of the tyre, and the same maximum width of the tyre, in a cross section thereof. Tyres for front wheels of Sport Touring motorcycles have a curvature ratio lower than about 0.32, whereas for example track racing tyres have a curvature ratio greater than about 0.32.

The term "maximum radial section width" or "maximum cord" is used to indicate the maximum width of the profile of the tyre, i.e. the size of the segment having as ends the two axially outermost points of the profile of the tread band.

The term "equatorial plane" of the tyre is used to indicate a plane perpendicular to the rotation axis of the tyre and that divides the tyre into two equal parts.

The term "tread pattern" is used to indicate the representation of all of the points of the tread band (including grooves) on a plane perpendicular to the equatorial plane of the tyre and tangent to the maximum diameter of the tyre.

The sizes of angles, and/or linear quantities (distances, widths, lengths, breadths, axial and/or circumferential segments, etc.), and/or surfaces should be considered to refer to the tread pattern as defined above.

The term "circumferential" direction and the term "circumferentially" are used to indicate a direction generically directed according to the rolling direction of the tyre (and therefore substantially parallel to the equatorial plane of the tyre).

The term "axial" direction and the term "axially" are used to indicate a direction perpendicular to the equatorial plane of the tyre, i.e. a direction parallel to the rotation axis of the tyre, or in any case inclined with respect to the rotation axis of the tyre by an angle lower than or equal to about 10°, preferably lower than or equal to about 5°.

The expressions "axially inner" and "axially outer" indicate a position respectively closer to, and farther from, the equatorial plane with respect to a reference element. Thus, for example, a first groove is axially outer with respect to a second groove if the axial distance of the first groove from the equatorial plane is greater than that of the second groove.

The term "circumferential extension" of the tyre, or of the tread band or of portions thereof, is used to indicate the extension in plan of the radially outer surface of the tyre, or of the tread band or of portions thereof, on a plane tangent to the tyre.

The expression "module" referred to a tread band, and in particular to the tread pattern, is used to indicate a portion of tread pattern repeated identically in succession along the entire circumferential extension of the tread band itself. The modules, even while keeping the same pattern configuration, can nevertheless have different circumferential lengths.

With reference to the angulation of the grooves of the tread band with respect to the equatorial plane of the tyre, such an angulation should be interpreted for each point of the groove as referring to the angle, comprised in absolute value between 0° and 90°, formed by making a rotation that, starting from the direction defined, in the tread pattern, by the equatorial plane, proceeds up to the direction tangent to the groove passing through such a point. In the case of a tyre suitable for being mounted on a rear wheel of a motorcycle, the aforementioned rotation should be deemed to be made by a vector oriented in the opposite direction to the direction of rotation of the tyre.

The term "circumferential groove" is used to indicate a groove that extends in a substantially circumferential direction, i.e. along a direction that, in the circumferential extension of the tread band (and therefore in the tread pattern), is parallel to the line defined by the equatorial plane of the tyre or inclined with respect to such a line by an angle lower than or equal to about 2°, preferably lower than or equal to about 1.5°, more preferably lower than or equal to about 1°.

The term "transversal groove" is used to indicate a groove comprising at least one groove portion that, in the circumferential extension of the tread band (and therefore in the tread pattern), extends along one or more directions inclined with respect to the lines defined by the rotation axis of the tyre by an angle comprised between about 0° and about 80°, more preferably between about 0° and about 75°.

In the case in which the groove comprises many portions inclined with respect to one another, such a groove is defined as "transversal groove" if, in the circumferential extension of the tread band (and therefore in the tread pattern), the groove extends along a respective direction inclined with respect to the line defined by the rotation axis of the tyre by an angle comprised between about 0° and about 80°, preferably between about 0° and about 75°, for more than 50% of the overall extension thereof.

The term "void to solid ratio" is used to indicate the ratio between the total surface of the grooves of a given annular portion of the tread pattern of the tyre (possibly of the entire tread band or tread pattern) and the surface of the given portion of tread pattern (possibly of the entire tread band or tread pattern). The void to solid ratio is intended to be substantially equal to zero if it is lower than or equal to about 2%, preferably lower than or equal to about 1%, even more preferably lower than or equal to about 0.5%.

The term "ground-contacting area" of the tyre is used to indicate the portion of tyre in contact with the road surface when the tyre is mounted on a wheel rim and a predetermined vertical load is exerted on the tyre.

Tyres for Sport Touring motorcycles need high versatility of use. In particular, they require grip and traction on the road surface so as to allow an optimal transfer of power, as well as an adequate braking action, even with a load of two people and on any type of road surface, like for example wet, dry, regular and/or irregular asphalt, and/or or type of routes, like for example urban roads, motorways, mountain roads with a large number of bends.

The aforementioned tyres also need comfort, stability, controllability, directionality, high mileage and regular wearing.

In order to satisfy all of the purposes discussed above it is known to form multiple transversal grooves on the tread band of the tyre that extend from axially inner annular portions of the tread band up to axially outer annular portions of the tread band.

The Applicant has observed that tyre manufacturers, given the high number of features, often contrasting with one another, required to tyres for Sport Touring motorcycles, have often concentrated their attention on trying to provide tyres optimized in terms of stability, drivability, grip in dry conditions, drainage, mileage and regular wearing, sometimes at the expense of optimizing the grip when accelerating in low or very low grip conditions, in particular in the wet.

However, the Applicant has observed that a sudden and/or unpredictable reduction in grip on the road surface could put the control of the motorcycle at risk.

The Applicant has thus felt the need to provide a Sport Touring motorcycle tyre equipped with excellent features of stability, drivability (or maneuverability), drainage, grip in dry conditions, mileage and regular wearing and that nevertheless makes it possible to improve the grip when accelerating in low or very low friction conditions, like for example those involved when travelling on cement, worn asphalt or cobblestones, in particular in the wet.

In general, it is possible to achieve an improvement in grip when accelerating on low-friction road surfaces by providing a plurality of transversal grooves both in the axially inner annular portion of the tread band, i.e. in the portion of tread band that is always in contact with the road surface during travel in a straight line and when making a slight turn, for example with camber angles lower than about 30°, and in the axially outer annular portions of the tread band, i.e. in the portions of tread band that are in contact with the road surface during a more pronounced bend, for example with camber angles greater than about 30°. Indeed, it is known that the transversal grooves, providing the two portions of tread band separated by each transversal groove with the ability to move with respect to one another and offering gripping fronts with the road surface, make it possible to increase the grip with the road surface and to improve the behavior of the tyre both when braking and when accelerating.

However, the Applicant has found that the provision of transversal grooves in the axially inner annular portion of the tread band generates greater wearing of the tyre during the most frequent travel conditions of the tyre, i.e. during travel in a straight line and when making slight turns, and causes noise.

The Applicant has therefore sought a solution suitable for providing a Sport Touring motorcycle tyre with good grip when accelerating in low or very low friction conditions, in particular in the wet, such a solution however being an alternative to providing transversal grooves in the axially inner annular portion of the tread band, so as not to encounter the drawbacks described above.

The Applicant has found that it is possible to obtain a good grip when accelerating on low-friction road surfaces without encountering the aforementioned drawbacks by providing a particular tread pattern having a module replicated along a circumferential direction of the tyre and comprising, in the axially inner portion of the tread band, astride of the equatorial plane, both a pair of circumferential grooves that extend along the circumferential direction for only part of the circumferential length of the module and that define between them a central annular portion of tread band having a void to solid ratio substantially equal to zero and a predetermined axial width, and a pair of lateral annular portions of tread band arranged in an axially outer position with respect to the aforementioned circumferential grooves and each comprising, in a position axially adjacent to the respective circumferential groove, a respective part of tread band having a circumferential length at least equal to that of the respective circumferential groove and a void to solid ratio substantially equal to zero, assigning to transversal grooves arranged on opposite sides with respect to the equatorial plane and in an axially outer position with respect to the aforementioned lateral annular portions the tasks of evacuating the water from the axially inner portion of the tread band towards the axially outer portions of the tread band in wet road conditions, as well as the task of offering lateral stability, grip and controllability, in the tighter bends.

The Applicant has found that the aforementioned circumferential grooves provide the two annular portions of tread band separated by each of them with the ability to move with respect to one another, in such a way achieving the desired grip of the tyre on the road surface when accelerating even in low friction conditions and in the presence of water. Moreover, the provision in the axially inner annular portion of the tread band of areas with a void to solid ratio substantially equal to zero makes it possible to satisfy the requirements discussed above in terms of wearing (and therefore mileage) and noise and makes it possible to obtain a substantial constancy of behavior of the tyre while rolling.

The present invention therefore relates to a motorcycle tyre, having an equatorial plane and a tread band comprising a plurality of grooves that form a tread pattern.

Preferably, the tread pattern includes a module replicated along a circumferential direction of the tyre.

Preferably, the module has a predetermined circumferential length.

Preferably, the module comprises a pair of circumferential grooves arranged on opposite sides with respect to the equatorial plane.

Preferably, the circumferential grooves extend along the circumferential direction of the tyre for part of said predetermined circumferential length.

Preferably, the circumferential grooves define between them a central portion of tread band having a void to solid ratio substantially equal to zero.

Preferably, the central annular portion of tread band has a predetermined axial width.

Preferably, the module comprises a plurality of pairs of transversal grooves arranged on opposite sides with respect to the equatorial plane.

Preferably, the transversal grooves are arranged at a distance from said equatorial plane greater than that of said circumferential grooves.

Preferably, the module comprises a pair of first lateral annular portions axially arranged between said circumferential grooves and said plurality of pairs of transversal grooves.

Preferably, each of said first lateral annular portions comprises, in a position axially adjacent to the respective circumferential groove, a respective part of tread band.

Preferably, the tyre has a curvature ratio lower than about 0.32, more preferably lower than or equal to about 0.30.

Preferably, the tyre has a curvature ratio greater than about 0.27, more preferably greater than or equal to about 0.29.

In preferred embodiments, the tyre has a curvature ratio comprised between about 0.27 and about 0.32, preferably between about 0.29 and about 0.30.

In accordance with the definition given above, the aforementioned curvature ratio identifies the tyre of the present invention as a Sport Touring motorcycle tyre, in particular for rear wheels of such a type of motorcycle.

The tyre of the present invention can comprise one or more of the features indicated hereinafter, taken singularly from one another or in combination with one another.

Preferably, the circumferential grooves extend along the circumferential direction of the tyre for at least 65% of said predetermined circumferential length.

Preferably, the tyre has a ground-contacting area having a predetermined circumferential width and a predetermined axial width.

Preferably, the ratio between said predetermined circumferential width and said predetermined axial width is lower than or equal to about 1.6, more preferably lower than or equal to about 1.5.

The Applicant has found that with the aforementioned ratio between circumferential width and axial width of the ground-contacting area at least part of the aforementioned transversal grooves enter in the ground-contacting area of the tyre even when the motorcycle travels in a straight line (even more so when cornering), contributing to improve the drainage of water in wet road conditions and the grip of the tyre on the road surface.

Preferably, the ratio between said predetermined circumferential width and said predetermined axial width is greater than or equal to about 1, more preferably greater than or equal to about 1.2.

In preferred embodiments, the ratio between said predetermined circumferential width and said predetermined axial width is comprised between about 1 and about 1.6, more preferably between about 1.2 and about 1.5.

Preferably, the axial width of said central portion of tread band is comprised between about 20% and about 50% of said predetermined axial width, more preferably between about 22% and about 45% of said predetermined axial width, even more preferably between about 25% and about 45% of said predetermined axial width, depending on the load which the tyre is subjected to.

The Applicant has found that in this way the contribution provided by the circumferential and transversal grooves for achieving all of the desired technical effects discussed above is optimized.

Preferably, the tyre has a maximum cord having a predetermined length.

Again in order to optimize the contribution provided by the circumferential and transversal grooves to achieve all of the desired technical effects discussed above, preferably, the axial width of said central portion of tread band is comprised between about 10% and about 20% of said predetermined length, more preferably between about 13% and about 15% of said predetermined length, depending on the size of tyre. For example, the axial width of said central annular portion of tread band is equal to about 14% of said predetermined length for a tyre 180/55ZR17.

In preferred embodiments, the axial width of said central portion of tread band is lower than or equal to about 28 mm, more preferably, lower than or equal to about 25 mm.

In accordance with the invention, each groove of said pair of circumferential grooves extends in said module along the circumferential direction of the tyre for a circumferential segment having a length shorter than said predetermined circumferential length. Such a provision makes it possible to provide further grip fronts of the tyre with the road surface, in this way increasing the performance of the tyre in terms of grip during acceleration, even in low-friction conditions.

Preferably, the length of said circumferential segment is comprised between about 60% and about 80% of said predetermined circumferential length, more preferably between about 65% and about 75% of said predetermined circumferential length, even more preferably between about 70% and about 72% of said predetermined circumferential length, depending on the size of the tyre.

Preferably, the length of said circumferential segment is comprised between about 100 mm and about 200 mm, depending on the size of the tyre.

Preferably, said plurality of pairs of transversal grooves comprises four pairs of transversal grooves arranged in succession along said circumferential direction of the tyre. The transversal grooves provide the tyre with a particular aesthetic appearance, as well as with the desired performance in terms of water drainage in wet road conditions and grip even in more pronounced bends.

Preferably, each of said four pairs of transversal grooves has respective first ends proximal to said equatorial plane and opposite second ends distal from said equatorial plane.

Preferably, the first ends of the grooves of three of said four pairs of transversal grooves have substantially the same axial distance from said equatorial plane.

Preferably, only two of said four pairs of transversal grooves have each a respective first end proximal to the equatorial plane that is axially adjacent to the respective part of tread band arranged in an axially outer position with respect to the respective circumferential groove and having a void to solid ratio substantially equal to zero.

Preferably, the module comprises a pair of secondary grooves arranged on opposite sides with respect to the equatorial plane. Such grooves contribute to the evacuation of water from the ground-contacting area in wet road conditions and provide the tyre with a particular aesthetic appearance.

Preferably, each of said secondary grooves is in a position circumferentially adjacent to a respective groove of said pair of circumferential grooves.

Preferably, the grooves of said pair of secondary grooves have respective first ends proximal to said equatorial plane and opposite second ends distal from said equatorial plane.

Preferably, the first ends of the grooves of said pair of secondary grooves are separated from one another by a first axial segment having a width lower than said predetermined axial width.

Preferably, the second ends of the grooves of said pair of secondary grooves are separated from one another by a second axial segment having a width greater than said predetermined axial width.

Preferably, the width of said second axial segment is lower than the distance between the first ends of the grooves of said three pairs of transversal grooves.

Preferably, each groove of the remaining pair of grooves of said four pairs of transversal grooves has a respective first end proximal to the equatorial plane that is axially adjacent to a respective secondary groove of said pair of secondary grooves.

BRIEF DESCRIPTION OF THE FIGURES

Further features and advantages of the tyre of the present invention will become clearer from the following detailed description of some preferred embodiments thereof, made with reference to the attached drawings purely as a non-limiting example. In such drawings.

DETAILED DESCRIPTION OF EMBODIMENTS OF THE INVENTION

Figure 1:
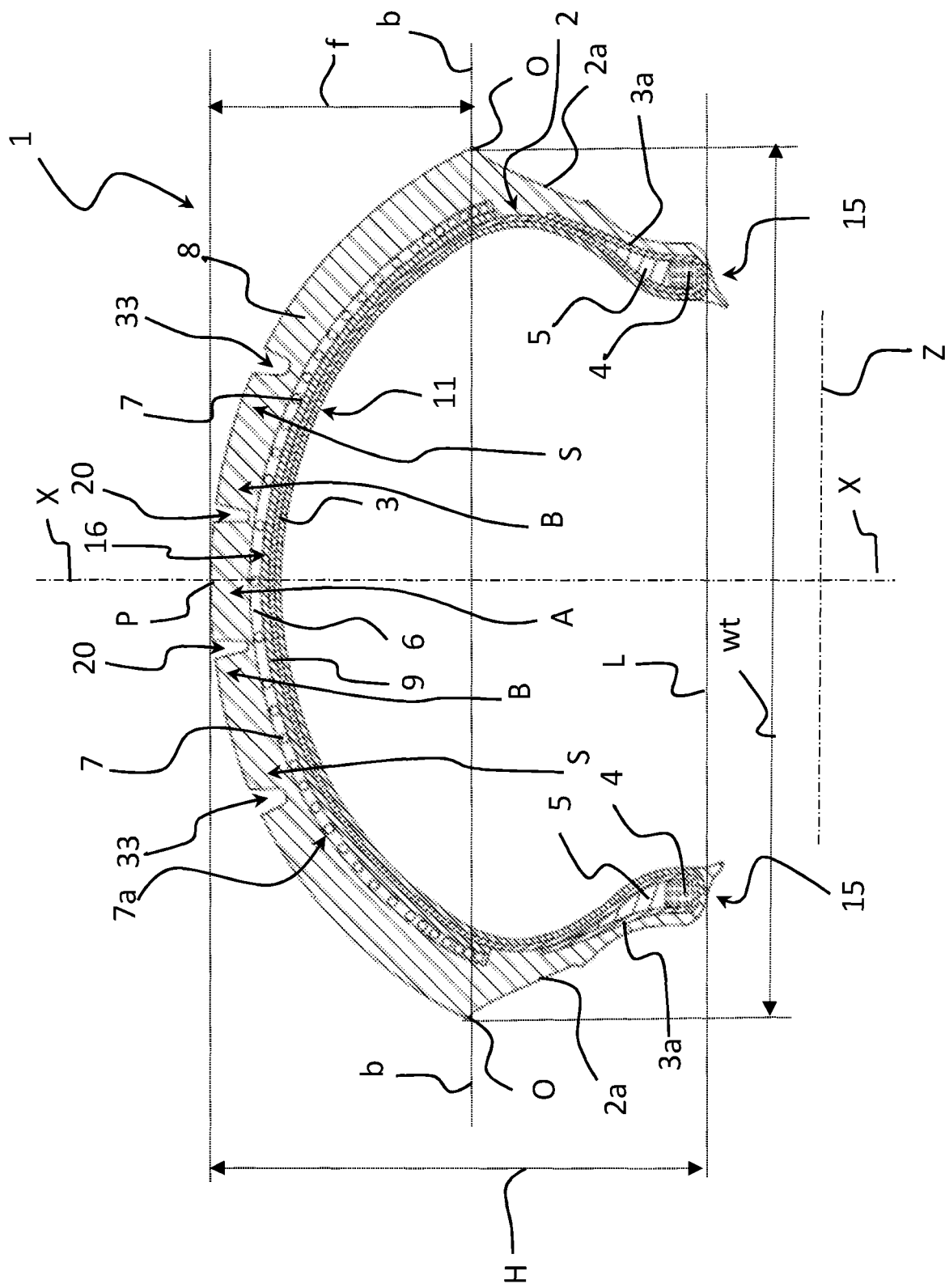
FIG. 1 shows a radial cross section view of a tyre according to the invention, the section being made along the line I-I of FIG. 2.

In FIG. 1, reference numeral 1 wholly indicates a tyre for motorcycle wheels according to the present invention. In particular, it is a tyre intended to be used on the rear wheel of a Sport Touring motorcycle.

An equatorial plane X-X and a rotation axis Z are defined in the tyre 1. A circumferential direction (indicated in FIG. 2 with the arrow R oriented in the direction of rotation of the tyre 1) and an axial direction perpendicular to the equatorial plane X-X are defined as well.

The tyre 1 comprises a carcass structure 2 having a central crown portion 16 including at least one carcass ply 3 described hereinafter in greater detail.

The carcass structure 2 is preferably coated, on the inner walls thereof, by a sealing layer 11, or so-called "liner", essentially consisting of a layer of airtight elastomeric material, adapted to provide the tyre once it is inflated with the hermetic seal.

The carcass ply 3 has the axially opposite lateral edges 3a thereof turned around respective annular reinforcing structures 4 intended to hold the tyre 1 on a corresponding mounting rim. The annular reinforcing structures 4 are typically called "bead cores".

A tapered elastomeric filler 5 that occupies the space defined between the carcass ply 3 and the corresponding turned lateral edge 3a of the carcass ply 3 is applied on the outer perimeter edge of the bead cores 4.

In an alternative embodiment, not shown, the carcass ply has opposite lateral edges thereof associated without turning with specific annular reinforcing structures provided with two metallic annular inserts. In this case, a filler made of elastomeric material can be arranged in an axially outer position with respect to the first annular insert. The second annular insert is, on the other hand, arranged in an axially outer position with respect to the end of the carcass ply. Finally, in an axially outer position with respect to said second annular insert, and not necessarily in contact with it, it is possible to provide a further filler that ends the manufacturing of the annular reinforcing structure.

The area of the tyre comprising the bead core 4 and the filler 5 forms the so-called "bead", globally indicated in FIG. 1 with 15, intended for anchoring the tyre on a corresponding mounting rim, not shown.

A belt structure 6, also described hereinafter in greater detail, is provided in a radially outer position with respect to the aforementioned carcass structure 2.

A tread band 8 is provided in a radially outer position with respect to the belt structure 6. By means of the tread band 8 the contact of the tyre 1 with the ground takes place.

The tyre 1 can further comprise a pair of sidewalls 2a applied laterally to the carcass structure 2 on axially opposite sides with respect to the equatorial plane X-X. The sidewalls 2a extend from the tread band 8 to the bead 15 of the tyre 1.

The tyre 1 of the present invention has a high transversal curvature and low sidewalls 2a.

The transversal curvature of a tyre is defined by the particular value of the curvature ratio or "arrow" of the tyre. With reference to FIG. 1 and in accordance with the definition given above, the curvature ratio is the ratio between the distance f of the radially outermost point P (or top) of the tread band 8 from the line b-b passing through the ends O of the tread band 8, measured on the equatorial plane X-X, and the distance wt between the ends O of the tread band 8. In all these cases, even if the ends of the tread band are not easily identifiable, for example due to the lack of a precise reference like for example the ends indicated in FIG. 1 with O, the distance wt can be certainly taken as the size of the maximum cord, or maximum radial section width, of the tyre.

The tyre 1 of the present invention preferably has a curvature ratio greater than or equal to 0.27, preferably greater than or equal to 0.29. Such a curvature ratio is in any case lower than or equal to 0.32, preferably lower than or equal to 0.30.

On the other hand, as far as the sidewalls 2a are concerned, the tyre 1 of the present invention is preferably a tyre with particularly low sidewalls, i.e. in which the ratio between the distance f and the height H, measured on the equatorial plane X-X between the top of the tread band 8 and the fitting diameter, identified by the reference line L passing through the beads 15 of the tyre 1, is lower than 0.65, more preferably lower than 0.6, for example equal to 0.55.

The carcass ply 3 is preferably made of elastomeric material and comprises a plurality of reinforcing elements (not shown) arranged parallel to one another and perpendicular to the equatorial plane.

The reinforcing elements included in the carcass ply 3 preferably comprise textile cords selected among those usually adopted in the manufacture of carcasses for tyres, for example nylon, rayon, PET, PEN, Lyocell, each cord comprising elementary wires each having a diameter comprised between 0.35 mm and 1.5 mm or steel metal cords with elementary wire of diameter comprised between 0.10 mm and 0.5 mm.

The belt structure 6 preferably comprises rubber-coated cords 7, arranged substantially parallel and adjacent in the axial direction on the crown portion 16 of the carcass structure 2, to form a plurality of coils 7a. Such coils 7a are substantially oriented according to the rolling direction of the tyre 1 (in particular with an angle comprised between 0° and 5° with respect to the equatorial plane X-X), such a direction usually being called "zero degrees". The aforementioned coils preferably extend over the entire crown portion 16 of the carcass structure 2.

Preferably, the belt structure 6 comprises windings of a single cord 7, or of a strip-like element of rubber-coated fabric comprising adjacent cords, preferably up to five, wound in a spiral from one end to the other on the crown portion 16 of the carcass structure 2.

Preferably, such cords 7 are made through steel wires with high carbon content (HT), in other words steel wires with a carbon content greater than 0.9%.

Alternatively, the belt structure 6 can comprise at least two radially juxtaposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have oblique orientation, but symmetrically crossed to the cords of the first layer, to form the so-called "crossed belt".

In this case, generally, the cords 7 of the belt structure 6 are generally textile cords, for example textile cords made of synthetic fiber, for example nylon, rayon, PEN, PET, preferably in synthetic fiber having a high modulus, in particular aramid synthetic fiber (aromatic polyamide). Alternatively, it is possible to use hybrid cords comprising at least one wire with a low modulus, in other words with a modulus not greater than 15 GPa (for example nylon or rayon), interwoven with at least one wire with high modulus (for example aramid fiber—AR, aromatic polyamide), in other words with a modulus not lower than 25 GPa.

For the aramid fibers (AR) the elastic modulus is evaluated according to BISFA—Testing methods for para-aramid fibre yarns, 2002 edition, Determination of the linear density—Chapter 6, Determination of the tensile properties—Chapter 7—Test procedure—Paragraph 7.5—with procedure with initial pretensioning.

For the other fibers (nylon, rayon, etc.) the elastic modulus is evaluated according to: BISFA—Testing methods for viscose, cupro, acetate, triacetate and lyocell filament yarns—2007 edition, Determination of tensile properties—Chapter 7—Tensile test conditions: oven dry test—Table 7.1—Test procedure—Paragraph 7.5—With oven dry test on relaxed samples—Subparagraph 7.5.2.4.

In both cases, the cords 7 of the belt structure 6 are textile or metal cords. Preferably, such cords are made of steel wires with high carbon content (HT), in other words steel wires with a carbon content greater than 0.9%. In the case of use of textile cords, these can be made of synthetic fiber, for example nylon, rayon, PEN, PET, preferably in synthetic fiber with a high modulus, in particular aramid synthetic fiber (aromatic polyamides).

Preferably, the belt structure 6 comprises a support layer 9 consisting substantially of a sheet of elastomeric material arranged between the layer of cords 7 and the carcass ply 3 and on which the coils 7a are wound. The layer 9 preferably extends on a surface having an axial extension substantially corresponding to the surface on which the coils 7a extend. Alternatively, the layer 9 can extend on a surface smaller than the surface of extension of the coils 7a, for example only on opposite lateral portions of the belt structure 6.

In a further embodiment that is not shown, an additional layer of elastomeric material is arranged between the belt structure 6 and the tread band 8. Such a layer preferably extends on a surface corresponding to the surface of extension of the belt structure 6. Alternatively, the aforementioned additional layer can extend on a surface corresponding to the surface of extension of the belt structure 6. Alternatively, the aforementioned additional layer can extend on a surface smaller than the surface of extension of the belt structure 6, for example only on opposite lateral portions of the belt structure 6.

In a preferred embodiment of the tyre 1 of the present invention, at least one among the layer 9 and the aforementioned additional layer comprises short aramid fibers, for example made of Kevlar®, dispersed in the elastomeric material.

The tread band 8 has a tread pattern defined by a plurality of grooves formed on the outer surface of the tread band 8 through a molding operation carried out simultaneously with the vulcanization of the tyre 1.

The aforementioned grooves define as a whole on the tread band 8 a void to solid ratio greater than 8%, for example equal to about 14%.

Preferably, in order to provide the tread band 8 with an adequate rigidity without limiting the drainage capacity thereof, the grooves define as a whole on the tread band 8 a void to solid ratio lower 20%, preferably lower 16%.

The tread pattern of the tyre 1 comprises a module T repeatedly replicated along a circumferential direction of the tyre 1. Preferably, the module T is repeated at least six times along the circumferential extension of the tyre 1, for example seven times.

Figure 2:
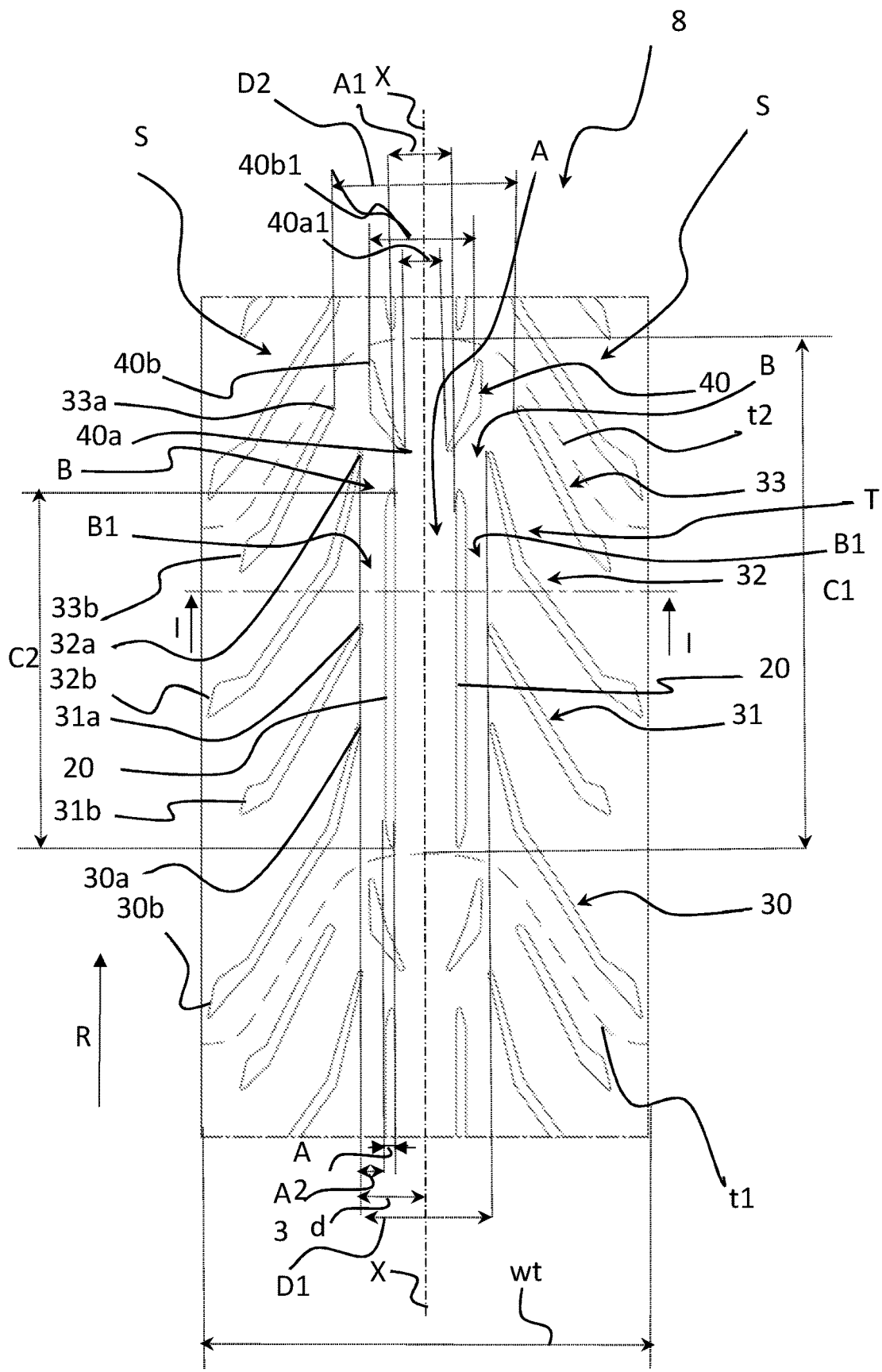
FIG. 2 shows a portion of the extension in plan of a portion of the tread band of the tyre of FIG. 1.

In the tyre 1 of the invention the module T corresponds to the portion of tread band 8 that, in the extension in plan shown in FIG. 2, is circumferentially delimited by the two broken lines t1 and t2.

The module T has a circumferential length, measured on the equatorial plane X-X, indicated with C1, and an axial length, measured on the extension in plan of the tread band 8 or, in other words, on a plane tangent to the tread band 8, equal to the length wt of the maximum cord of the tyre 1.

Figure 3:
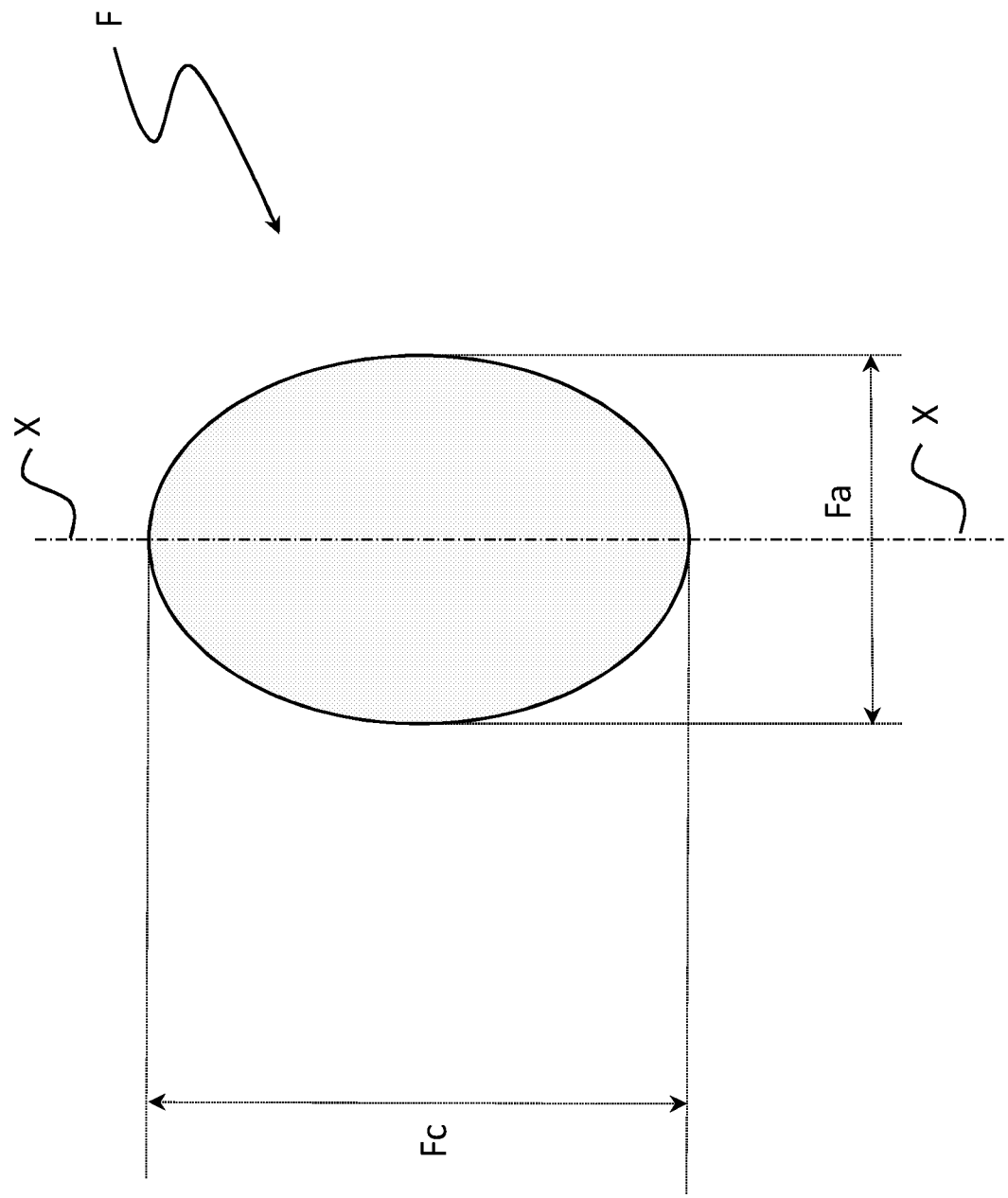
FIG. 3 shows a schematic and simplified view of the ground-contacting area of the tyre of FIG. 1 (for the sake of simplicity of illustrations, the grooves of the tyre are not represented in the ground-contacting area).

With reference to FIG. 3, the tyre 1 has a ground-contacting area F having a circumferential width Fc and an axial width Fa such that the ratio between said predetermined circumferential width Fc and said predetermined axial width Fa is preferably comprised between about 1 and about 1.8, more preferably between about 1.4 and about 1.7.

For example, the ratio between Fc and Fa is equal to about 1.65 in a tyre 1 of the type 180/55ZR17 subjected to a load equal to 200 kg.

As clearly shown in FIG. 2, in the module T it is possible to identify a central annular portion A arranged astride of the equatorial plane X-X, a pair of first lateral annular portions B arranged on axially opposite sides with respect to the equatorial plane X-X and in an axially outer position with respect to the central annular portion A, and a pair of second lateral annular portions S arranged on axially opposite sides with respect to the equatorial plane X-X and in an axially outer position with respect to the pair of first lateral annular portions B.

The central annular portion A, the first lateral annular portions B and the axially inner areas of the second lateral annular portions S are defined in an area of the tread band 8 intended to come into contact with the road surface when the motorcycle travels in a straight line or turns slightly, for example with a camber angle lower than about 30°, whereas the axially outer areas of the second lateral annular portions S are mainly defined in shoulder areas of the tread band 8, i.e. in those areas intended to come into contact with the road surface when the motorcycle corners leaning in a more pronounced manner, for example with a camber angle greater than about 30°.

The tyre 1 has, at the aforementioned central annular portion A, and possibly at the aforementioned first lateral annular portions B, a first radius of curvature (corresponding to f in FIG. 1), preferably comprised between about 80 mm and about 130 mm, for example equal to about 120 mm.

Preferably, the tyre 1 has, at each of the second lateral annular portions S thereof, a second radius of curvature lower than the aforementioned first radius of curvature. Preferably, the aforementioned second radius of curvature is comprised between about 80 mm and about 110 mm, for example equal to about 100 mm.

In particular embodiments, the tyre 1 has the aforementioned second radius of curvature in the first lateral annular portions B and in the axially inner areas of each of the second lateral annular portions S thereof and a third radius of curvature smaller than the second radius of curvature in the axially outer areas of each of the second lateral annular portions S. In this case, preferably, the aforementioned third radius of curvature is comprised between about 60 mm and about 100 mm, for example equal to about 90 mm.

The central annular portion A is axially delimited by a pair of circumferential grooves 20 arranged on opposite sides with respect to the equatorial plane X-X and extending in the module T along the circumferential direction of the tyre 1 for a circumferential segment having a length C2 shorter than the circumferential length C1 of the module T.

Preferably, the aforementioned length C2 is comprised between about 60% and about 80% of the circumferential length C1 of the module T.

In preferred embodiments, the aforementioned length C2 is comprised between about 100 mm and about 200 mm.

The central annular portion A has a constant axial width A1 along the circumferential extension of the tyre 1. The two circumferential grooves 20 are therefore parallel to one another.

Preferably, the axial width A1 is comprised between about 20% and about 50% of the axial width Fa of the ground-contacting area F, more preferably between about 22% and about 45% of the axial width Fa of the ground-contacting area F, more preferably between about 25% and about 45% of the axial width Fa of the ground-contacting area F, depending on the size of the tyre 1 and the load which such a tyre 1 is subjected to.

The aforementioned axial width A1 is also comprised, preferably, between about 10% and about 20% of the length wt of the maximum cord of the tyre 1, more preferably between about 13% and about 15% of the length wt of the maximum cord of the tyre 1, depending on the size of the tyre 1 and the load which such a tyre 1 is subjected to.

For example, the axial width A1 is equal to about 14% of the length wt of the maximum cord of a tyre 1 of the type 180/55ZR17 subjected to a load equal to 200 Kg.

In particularly preferred embodiments, the aforementioned axial width A1 is lower than or equal to about 28 mm, preferably lower than or equal to about 25 mm, for example equal to about 23 mm for a tyre 1 subjected to the load indicated above and having the dimensions indicated above.

Preferably, each of the circumferential grooves 20 has a width A2 comprised between about 3.5 mm and about 5.5 mm.

In particularly preferred embodiments, each of the aforementioned first lateral annular portions B has an axial width A3 comprised between about 7 mm and about 14 mm.

Each lateral annular portion B comprises, in a position axially adjacent to the respective circumferential groove 20, a respective part B1 of tread band having a circumferential length at least equal to that of the circumferential groove 20.

In order to obtain an optimal compromise between grip on the ground, water drainage in wet road conditions and rigidity, and consequently an adequate response of the tyre while driving in a straight line and when cornering, both the central annular portion A and the aforementioned parts B1 of tread band have a void to solid ratio substantially equal to zero, whereas the aforementioned second lateral annular portions S comprise a plurality of pairs of transversal grooves.

In the specific example shown in the attached figures, in both the central annular portion A and the aforementioned parts B1 of tread band there are no grooves.

Again in the specific example shown in the attached figures, there are four pairs of transversal grooves 30, 31, 32, 33 arranged in succession in the module T along the circumferential direction of the tyre moving from the line t1 towards the line t2.

The grooves of each pair of grooves 30, 31, 32, 33 are arranged symmetrically with respect to the equatorial plane X-X a distance from the equatorial plane X-X greater than that of the circumferential grooves 20.

Hereinafter the transversal grooves 30, 31, 32, 33 are described in greater detail with reference to a single side of the tread band 8 with respect to the equatorial plane X-X. It is understood that what is described is also valid for the other side of the tread band 8.

All of the transversal grooves 30, 31, 32, 33 extend in the module T along respective broken lines defined by at least two differently-inclined rectilinear segments, where each segment is inclined with respect to the equatorial plane X-X by a respective predetermined angle. However, it is possible to provide a different number of segments from those indicated below or even a single curvilinear segment.

In the specific example shown in the attached figures, the transversal grooves 30 and 32 are defined by three differently-inclined rectilinear segments, whereas the transversal grooves 31 and 33 are defined by two differently-inclined rectilinear segments.

The transversal groove 31 is circumferentially arranged between the transversal grooves 30 and 32, whereas the transversal groove 32 is circumferentially arranged between the transversal grooves 31 and 33.

In order to optimize the evacuation of water from the axially inner portion of the tread band 1 towards the opposite axially outer portions in wet road conditions, the single segments of the transversal grooves 30, 31, 32, 33 are inclined with respect to the equatorial plane X-X by respective angles whose size increases progressively moving away from the equatorial plane X-X. In particular, each transversal groove 30, 31, 32, 33 has an axially inner segment having an angle of inclination with respect to the equatorial plane X-X lower than that of the axially outer segment and the transversal grooves 30 and 32 have a segment axially arranged between the respective axially inner and axially outer segments (hereinafter said segment is indicated as "intermediate segment") that is inclined with respect to the equatorial plane X-X by an angle greater than that of the axially inner segment and lower than that of the axially outer segment.

The transversal grooves 30, 31, 32, 33 have respective first axially inner ends 30a, 31a, 32a, 33a that are proximal to the equatorial plane X-X and respective second axially outer ends 30b, 31b, 32b, 33b that are distal from the equatorial plane X-X.

Considering the direction of rotation R of the tyre 1 indicated in FIG. 2, the first ends 30a, 31a, 32a, 33a of the transversal grooves 30, 31, 32, 33 enter into the ground-contacting area F of the tyre 1 before the second ends 30b, 31b, 32b, 33b.

The first ends 30a, 31a, 32a, 33a of the transversal grooves 30, 31, 32, 33 are axially spaced from the circumferential grooves 20. In other words, the transversal grooves 30, 31, 32, 33 do not meet the circumferential grooves 20.

The first ends 30a, 31a, 32a of the transversal grooves 30, 31, 32 have the same axial distance from the equatorial plane X-X, whereas the first end 33a of the transversal groove 33 is arranged at an axial distance from the equatorial plane X-X greater than that of the first ends 30a, 31a, 32a of the transversal grooves 30, 31, 32.

The axial distance d of the first ends 30a, 31a, 32a of the transversal grooves 30, 31, 32 from the equatorial plane X-X is equal to the sum of the axial width A3 of each of the first lateral annular portions B, of the width A2 of each circumferential groove 20 and of half the axial width A1 of the central annular portion A.

The second end 30b of the transversal groove 30 has the same axial distance from the equatorial plane X-X as the second end 32b of the transversal groove 32, whereas the second end 31b of the transversal groove 31 has the same axial distance from the equatorial plane X-X as the second end 33b of the transversal groove 33, the latter distance being lower than that of the second ends 30b, 32b.

Again in order to optimize the evacuation of water, the circumferential width of each transversal groove 30, 31, 32, 33 increases moving from the respective first end 30a, 31a, 32a, 33a towards the respective second end 30b, 31b, 32b, 33b. In particular, in the embodiment shown herein:

the axially inner segment and the axially outer segment of each of the transversal grooves 30 and 32 have a circumferential width continuously increasing moving away from the equatorial plane X-X, whereas the intermediate segment has a circumferential width that is substantially constant moving away from the equatorial plane X-X;

the two segments of each of the transversal grooves 31 and 33 both have a circumferential width continuously increasing moving away from the equatorial plane X-X.

However, alternative embodiments can be foreseen wherein the intermediate segment of the transversal grooves 30 and 32 has a circumferential width continuously increasing moving away from the equatorial plane X-X and/or wherein at least one of the axially inner and axially outer segments of the transversal grooves 30 and 32 or of the two segments of the transversal grooves 31 and 33 have a circumferential width that is substantially constant moving away from the equatorial plane X-X.

In the specific example shown in the attached figures, in the module T only two of the four transversal grooves 30, 31, 32, 33 (in particular the transversal grooves 30 and 31) have the respective first end (in this specific case therefore the first ends 30a, 31a) axially aligned to the respective part B1 of tread band 8, the first ends 32a, 33a of the other transversal grooves 32, 33 thereof are, on the other hand circumferentially offset with respect to the respective part B1 of tread band 8.

The module T further comprises a pair of secondary grooves 40 arranged on opposite sides with respect to the equatorial plane X-X. Each of the secondary grooves 40 is in a position circumferentially adjacent to a respective groove of the pair of circumferential grooves 20.

Such secondary grooves 40 are described hereinafter with reference to just one side of the tread band 8 with respect to the equatorial plane X-X. It is understood that what is described is also valid for the other side of the tread band 8.

The secondary groove 40 has a first end 40a proximal to the equatorial plane X-X and circumferentially facing towards the transversal grooves 30, 31, 32, 33 and a second end 40b distal from the equatorial plane X-X and circumferentially facing the opposite way with respect to the transversal grooves 30, 31, 32, 33. Therefore, the first ends 40a of the grooves of the aforementioned pair of secondary grooves 40 are separated from one another by a first axial segment 40a1 and the second ends 40b of the grooves of the aforementioned pair of secondary grooves 40 are separated from one another by a second axial segment 40b1 having a width greater than that of the first axial segment 40a1.

The width of the aforementioned first axial segment 40a1 is smaller than the distance D1 between the first ends 30a, 31a, 32a of the grooves of the three pairs of transversal grooves 30, 31, 32. In the specific example shown in the attached figures, the width of the aforementioned first axial segment 40a1 is also slightly smaller than the axial width A1 of the central annular portion A of the tread band 8.

The width of the second axial segment 40b1 is smaller than the distance D2 between the first ends 33a of the grooves of the pair of grooves 33 that in the module T is in a position closer to the grooves 40.

The transversal grooves 40 are thus arranged in the lateral annular portions B of the tread band 8, each arranged between two circumferentially consecutive parts B1.

In the specific example shown in the attached figures, each of the aforementioned parts B1 of tread band 8 has a circumferential length greater than C2.

Considering the direction of rotation R of the tyre 1 indicated in FIG. 2, the first end 40a of the secondary groove 40 enters into the ground-contacting area F of the tyre 1 after the second end 40b of the secondary groove 40.

The first end 40a of the secondary groove 40 can be substantially axially aligned or slightly circumferentially offset with respect to the first end 32a of the transversal groove 32.

The transversal groove 40 is preferably arranged in the module T so as to be axially adjacent to the first end 33a of the transversal groove 33.

EXAMPLES AND TESTS

The Applicant made a sample of a tyre 1 in accordance with an embodiment of the present invention and in particular having the tread pattern shown in FIG. 2.

Such a tyre 1 was of the type 180/55ZR17 and had inflation pressures equal to 2.9 bar.

Such a tyre 1 was subjected to comparative tests with a reference tyre for Sport Touring motorcycles produced in accordance with WO 2010/073279, appreciated by customers for its behavior on dry and wet road surfaces in terms of maneuverability and braking and for the low noise levels produced while rolling. Such a reference tyre is indicated hereinafter with Ref.

The tests were carried out by mounting both tyres on the rear wheel of a Suzuki Bandit 1250 motorcycle.

Maneuverability, mileage, stability at high speed, traction (grip during acceleration) on a low-friction wet road surface, noise and regularity of wearing were evaluated.

Table 1 shown below gives the average evaluations obtained. Such evaluations are expressed by comparing the parameters of tyre 1 (invention) with respect to the same parameters of tyre Ref. (reference).

TABLE 1

|  | 1 | Ref. |
| --- | --- | --- |
| Maneuverability | = | = |
| Mileage km | = | = |
| Stability at high speed | = | = |
| Traction on a low-friction wet road surface | + | = |
| Noise | = | = |
| Regularity of wearing | + | = |

In the aforementioned table, "=" indicates the level, considered excellent, obtained in the tyre Ref. and "+" indicates an improvement with respect to the tyre Ref.

The tyre 1 of the invention offered improved results with respect to the already excellent results of the tyre Ref. as far as traction on a low-friction wet road surface and regularity of wearing are concerned and had behavior in line with the already excellent one of the tyre Ref. as far as maneuverability, mileage, stability at high speed and noise are concerned.

The Applicant has thus found that, being equal the other structural features, the contribution offered by the circumferential grooves 20 is decisive to obtain a surprising improvement in behavior when accelerating on a low-friction wet road surface with respect to the reference tyre Ref., even in the absence of transversal grooves in the central annular portion A, whereas the advantageous improvement in terms of regularity of wearing with respect to the reference tyre Ref. is mainly a consequence of the provision of the central annular portion A devoid of grooves.

Of course, those skilled in the art can bring further modifications and variants to the tyre 1 described above in order to satisfy specific and contingent application requirements, said variants and modifications in any case being within the scope of protection as defined by the following claims.

The invention claimed is:

1. A motorcycle tyre, having an equatorial plane (X-X) and a tread band comprising a plurality of grooves forming a tread pattern with a module replicated along a circumferential direction of the tyre and a predetermined circumferential length, wherein the module comprising:
a pair of circumferential grooves arranged on opposite sides with respect to the equatorial plane (X-X) of the tyre, the circumferential grooves extending along the circumferential direction for only part of the predetermined circumferential length of the module and defining between them a central portion of the tread band having a void to solid ratio substantially equal to zero and a predetermined axial width, wherein each groove of the pair of circumferential grooves extends in the module along the circumferential direction of the tyre for a circumferential segment having a length shorter than the predetermined circumferential length of the module;
a plurality of pairs of transversal grooves arranged on opposite sides with respect to the equatorial plane (X-X) of the tyre at a distance from the equatorial plane (X-X) of the tyre greater than a distance from the circumferential grooves to the equatorial plane (X-X) of the tyre; and
a pair of first lateral annular portions axially arranged between the pair of circumferential grooves and the plurality of pairs of transversal grooves, each of the first lateral annular portions comprising, in a position axially adjacent to the respective circumferential groove, a respective part having a circumferential length at least equal to that of the circumferential grooves and a void to solid ratio substantially equal to zero;
wherein the tyre has a curvature ratio lower than about 0.32,
wherein the module comprises a pair of secondary grooves arranged on opposite sides with respect to the equatorial plane (X-X) of the tyre, each of the secondary grooves being in a position circumferentially adjacent to a respective groove of the pair of circumferential grooves, and
wherein the plurality of pairs of transversal grooves comprises four pairs of transversal grooves, wherein each groove of the four pairs of transversal grooves has respective first ends proximal to the equatorial plane (X-X) and opposite second ends distal from the equatorial plane (X-X) and wherein the first ends of the grooves of three of the four pairs of transversal grooves have substantially the same axial distance from the equatorial plane (X-X), wherein each groove of the remaining pair of transversal grooves of the four pairs of transversal grooves has a respective first end proximal to the equatorial plane (X-X) that is axially adjacent to a respective secondary groove of the pair of secondary grooves.

2. A motorcycle tyre, having an equatorial plane (X-X) and a tread band comprising a plurality of grooves forming a tread pattern with a module replicated along a circumferential direction of the tyre and a predetermined circumferential length, wherein the module comprising:
a pair of circumferential grooves arranged on opposite sides with respect to the equatorial plane (X-X) of the tyre, the circumferential grooves extending along the circumferential direction for only part of the predetermined circumferential length of the module and defining between them a central portion of the tread band having a void to solid ratio substantially equal to zero and a predetermined axial width, wherein each groove of the pair of circumferential grooves extends in the module along the circumferential direction of the tyre for a circumferential segment having a length shorter than the predetermined circumferential length of the module;
a plurality of pairs of transversal grooves arranged on opposite sides with respect to the equatorial plane (X-X) of the tyre at a distance from the equatorial plane (X-X) of the tyre greater than a distance from the circumferential grooves to the equatorial plane (X-X) of the tyre; and
a pair of first lateral annular portions axially arranged between the pair of circumferential grooves and the plurality of pairs of transversal grooves, each of the first lateral annular portions comprising, in a position axially adjacent to the respective circumferential groove, a respective part having a circumferential length at least equal to that of the circumferential grooves and a void to solid ratio substantially equal to zero;
wherein the tyre has a curvature ratio lower than about 0.32,
wherein the module comprises a pair of secondary grooves arranged on opposite sides with respect to the equatorial plane (X-X) of the tyre, each of the secondary grooves being in a position circumferentially adjacent to a respective groove of the pair of circumferential grooves, and wherein the grooves of the pair of secondary grooves have respective first ends proximal to the equatorial plane (X-X) of the tyre and opposite second ends distal from the equatorial plane (X-X) of the tyre, wherein the first ends of the grooves of the pair of secondary grooves are spaced apart from each other by a first axial segment having a width less than the predetermined axial width of the central portion of the tread band and the second ends of the grooves of the pair of secondary grooves are spaced apart from each other by a second axial segment having a width greater than the predetermined axial width of the central portion of the tread band.

3. A motorcycle tyre, having an equatorial plane (X-X) and a tread band comprising a plurality of grooves forming a tread pattern with a module replicated along a circumferential direction of the tyre and a predetermined circumferential length, wherein the module comprising:
  a pair of circumferential grooves arranged on opposite sides with respect to the equatorial plane (X-X) of the tyre, the circumferential grooves extending along the circumferential direction for only part of the predetermined circumferential length of the module and defining between them a central portion of the tread band having a void to solid ratio substantially equal to zero and a predetermined axial width, wherein each groove of the pair of circumferential grooves extends in the module along the circumferential direction of the tyre for a circumferential segment having a length shorter than the predetermined circumferential length of the module;
  a plurality of pairs of transversal grooves arranged on opposite sides with respect to the equatorial plane (X-X) of the tyre at a distance from the equatorial plane (X-X) of the tyre greater than a distance from the circumferential grooves to the equatorial plane (X-X) of the tyre; and
  a pair of first lateral annular portions axially arranged between the pair of circumferential grooves and the plurality of pairs of transversal grooves, each of the first lateral annular portions comprising, in a position axially adjacent to the respective circumferential groove, a respective part having a circumferential length at least equal to that of the circumferential grooves and a void to solid ratio substantially equal to zero;
  wherein the tyre has a curvature ratio lower than about 0.32, and
  wherein the length of the circumferential segment ranges from about 60% to about 80% of the predetermined circumferential length of the module.

4. The motorcycle tyre according to claim 3, wherein the tyre has a maximum cord having a predetermined length, and the predetermined axial width of the central portion of the tread band ranges from about 10% to about 20% of the predetermined length of the maximum cord.

5. The motorcycle tyre according to claim 3, wherein the predetermined axial width of the central portion of the tread band is less than or equal to about 28 mm.

6. The motorcycle tyre according to claim 3, wherein the length of the circumferential segment ranges from about 100 mm to about 200 mm.

7. The motorcycle tyre according to claim 3, wherein the length of the circumferential segment ranges from about 65% to about 75% of the predetermined circumferential length of the module.

8. The motorcycle tyre according to claim 3, wherein the tyre has a ground-contacting area with a predetermined circumferential width and a predetermined axial width, wherein a ratio between the predetermined circumferential width of the ground-contacting area and the predetermined axial width of the ground-contacting area is lower than about 1.6.

9. The motorcycle tyre according to claim 8, wherein the predetermined axial width of the central portion of the tread band ranges from about 20% to about 50% of the predetermined axial width of the ground-contacting area.

10. The motorcycle tyre according to claim 3, wherein the plurality of pairs of transversal grooves comprises four pairs of transversal grooves arranged in succession along the circumferential direction of the tyre.

11. The motorcycle tyre according to claim 10, wherein each groove of the four pairs of transversal grooves has a respective first end proximal to the equatorial plane (X-X) of the tyre and an opposite second end distal from the equatorial plane (X-X) of the tyre and wherein the first ends of the grooves of three of the four pairs of transversal grooves are arranged at substantially the same axial distance from the equatorial plane (X-X) of the tyre.

12. The motorcycle tyre according to claim 10, wherein each groove of only two of the four pairs of transversal grooves has a respective first end proximal to the equatorial plane (X-X) of the tyre that is axially adjacent to the respective part of the respective first lateral annular portion of the module.

13. The motorcycle tyre according to claim 3, wherein the module comprises a pair of secondary grooves arranged on opposite sides with respect to the equatorial plane (X-X) of the tyre, each of the secondary grooves being in a position circumferentially adjacent to a respective groove of the pair of circumferential grooves.

14. The motorcycle tyre according to claim 13, wherein the plurality of pairs of transversal grooves comprises four pairs of transversal grooves, wherein each groove of the four pairs of transversal grooves has respective first ends proximal to the equatorial plane (X-X) and opposite second ends distal from the equatorial plane (X-X) and wherein the first ends of the grooves of three of the four pairs of transversal grooves have substantially the same axial distance from the equatorial plane (X-X), wherein each groove of the remaining pair of transversal grooves of the four pairs of transversal grooves has a respective first end proximal to the equatorial plane (X-X) that is axially adjacent to a respective secondary groove of the pair of secondary grooves.

15. The motorcycle tyre according to claim 13, wherein the grooves of the pair of secondary grooves have respective first ends proximal to the equatorial plane (X-X) of the tyre and opposite second ends distal from the equatorial plane (X-X) of the tyre, wherein the first ends of the grooves of the pair of secondary grooves are spaced apart from each other by a first axial segment having a width less than the predetermined axial width of the central portion of the tread band and the second ends of the grooves of the pair of secondary grooves are spaced apart from each other by a second axial segment having a width greater than the predetermined axial width of the central portion of the tread band.

16. The motorcycle tyre according to claim 15, wherein the plurality of pairs of transversal grooves comprises four pairs of transversal grooves, wherein each groove of the four pairs of transversal grooves has respective first ends proximal to the equatorial plane (X-X) and opposite second ends distal from the equatorial plane (X-X) and wherein the first ends of the grooves of three of the four pairs of transversal grooves have substantially the same axial distance from the equatorial plane (X-X), wherein the width of the second axial segment is less than the distance between the first ends of the grooves of the three pairs of transversal grooves.

* * * * *